S. ROBINSON.
MEANS FOR PACKING RECIPROCATING PISTONS AND THE LIKE.
APPLICATION FILED FEB. 19, 1909.
940,068.
Patented Nov. 16, 1909.
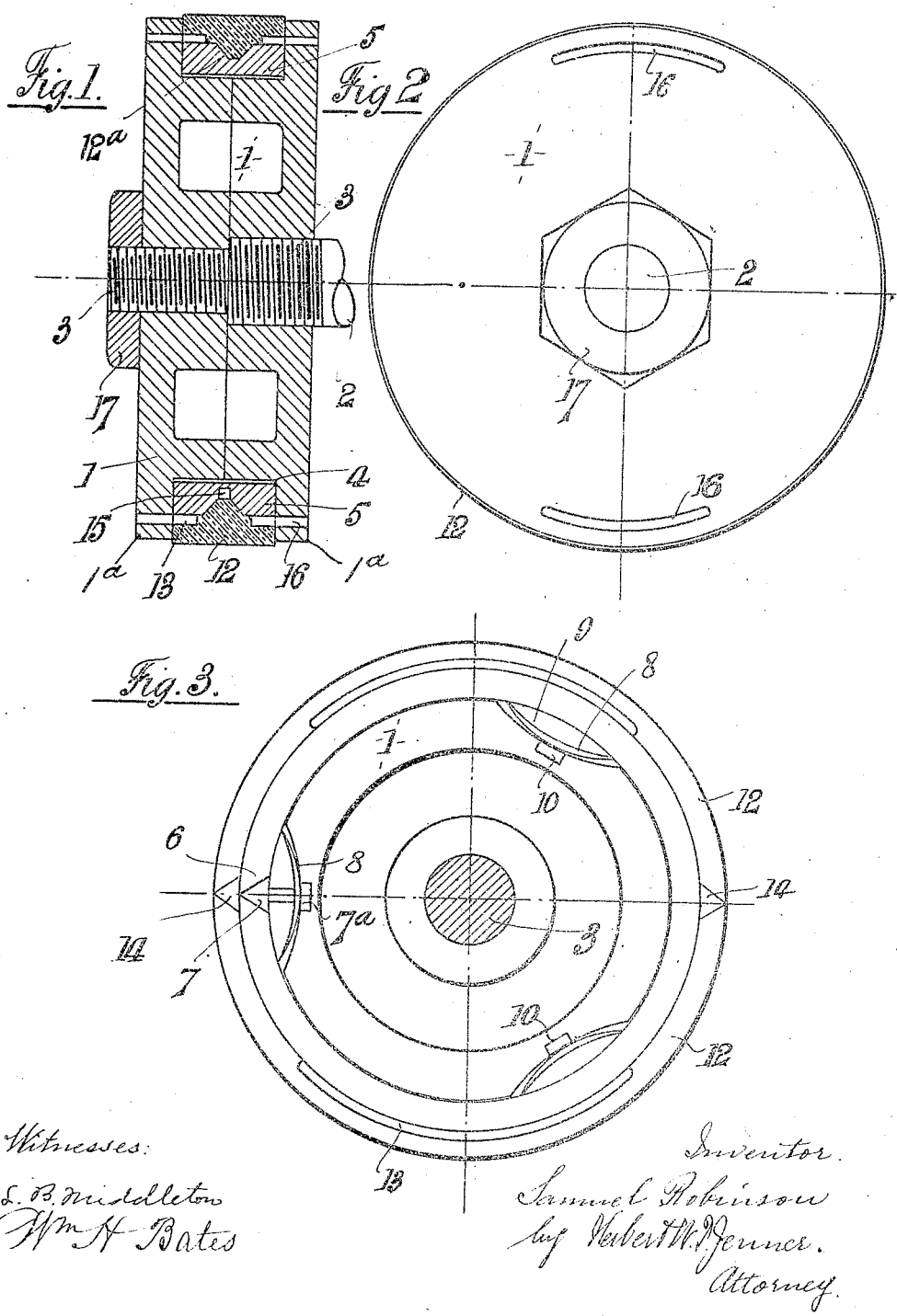

UNITED STATES PATENT OFFICE.

SAMUEL ROBINSON, OF PIMLICO, LONDON, ENGLAND.

MEANS FOR PACKING RECIPROCATING PISTONS AND THE LIKE.

940,068. Specification of Letters Patent. Patented Nov. 16, 1909.

Application filed February 19, 1909. Serial No. 478,807.

*To all whom it may concern:*

Be it known that I, SAMUEL ROBINSON, of 35 Moreton street, Pimlico, London, S.W., England, engineer, have invented certain new and useful Improvements in Means for Packing Reciprocating Pistons and the Like; and I do hereby declare the following to be a full, clear, and exact description of the invention, such as will enable others skilled in the art to which it appertains to make and use the same.

My invention consists in improvements in pistons for steam or other fluid engines, pumps and the like, and relates more particularly to the means for packing same.

Hitherto it has been customary to pack reciprocating pistons with resilient metallic rings whose expansive properties are solely responsible for keeping steam tight the one portion of the cylinder from the other as divided by said piston. Apart from the difficulty of getting a ring of larger external diameter than the cylinder into the latter, there is always the trouble that arises sooner or later from the mid-distance diameter of the cylinder wearing larger than the diameters at the ends. Hence a resilient packing ring that is a sliding fit at the middle of the cylinder is more or less tight at the ends, and excessive friction results with loss of power. On the other hand, were the piston a working fit at the ends of the cylinder and loose at the middle, there would be a leakage past the piston of live steam and the accompanying waste of energy that this fault entails. To overcome this disadvantage I pack my improved pistons with expansive rings but whose peripheral contact with the walls of the cylinder is dependent upon and varies in direct proportion to, the pressure of the steam driving said pistons.

I will now proceed to describe my invention more particularly by reference to the accompanying drawings, in which:—

Figure 1 is a sectional elevation. Fig. 2 is a plan of piston. Fig. 3 is a plan of piston with the upper cover removed.

In the drawings 1 is the piston made in two halves each part being screwed on the piston rod 2, as shown in Fig. 1, with screw threads 3 of differing pitches. The piston thus formed has a cavity 4 accommodating a resilient packing piston ring 5. The ring is divided as at 6 and the wedge shaped bolt head 7 inserted, the other end of the said bolt, 7ª, being recessed within the piston 1 as shown. A plurality of springs 8, depending in number upon the size of the piston, are disposed in recesses 9, formed in the inner metal of the piston, adapted to exert an outward and radial pressure upon the resilient ring 5. The springs 8 have snugs 10, adapted to keep said springs in place. A second and outer divided piston ring 12 is mounted between the piston disk flanges 1ª immediately over the resilient ring 5, which outer ring, as a whole, for the sake of distinction, I will term the steam ring. The steam ring 12 has a segmental slot 13, cut in two or more places around its inner circumference for a short depth on both sides as shown, and is formed with a projection 12ª around its inner periphery fitting a corresponding recess in the resilient ring 5. Wedge shaped packing strips 14 are inserted between the divisions in the steam ring as shown, which serve as distance pieces when assembling the ring parts and to prevent creeping or leakage when the ring is at work under low pressure. To prevent relative movement between the two rings I provide a pin or pins 15, on each half of the steam ring 12, entering corresponding holes in the steam ring 5, see Fig. 1. The piston disks 1 are perforated as at 16 with slots covering the segmental apertures 13 formed in the steam ring 12, whereby steam can enter the said ring and tend to expand same against the walls of the cylinder.

The operation of my invention is as follows:—The piston and its parts are assembled and secured firmly in position by means of the nut 17 on piston rod end 3, which nut may be cross pinned if necessary. The piston is placed in the cylinder, the resilient ring exerting outward circumferential pressure. Upon the entry of live steam to the cylinder the steam pressure is communicated through the aperture 16 to the back of the steam ring 12, by entering the slot 13, driving said ring outward with a force equal to the steam pressure. In this manner it will be observed that the piston is automatically packed according to the work it has to do, effecting a great economy over existing types of pistons, which are usually packed to be steam tight at the maximum pressure, when the forces driving the piston below such pressure must overcome the maximum piston friction throughout the entire stroke. Further in the event of the cylinder becoming elliptical through wear, it is found that a piston of the type hereinbefore described will prevent leakage when that of the ordinary type fails.

I claim.

1. The combination, with a piston having a circumferential groove, and having also lateral steam passages between the said groove and its outer faces; of an expansion-ring provided with springs and arranged in the bottom of the said groove, and an outer packing-ring which bears on the said expansion-ring, one of the said rings being provided with expansion chambers for steam at its side portions between it and the other ring, which chambers communicate with the said steam passages.

2. The combination, with a piston having a circumferential groove, and having also lateral steam passages between the said groove and its outer faces; of an expansion-ring provided with springs and arranged in the bottom of the said groove, and an outer packing-ring, one of the said rings being provided at its middle part with an annular projection which engages with a corresponding recess in the other ring, and one of the said rings being provided with expansion chambers for steam at its side portions between it and the other ring, which chambers communicate with the said steam passages.

3. The combination, with a piston having a circumferential groove, and having also lateral steam passages between the said groove and its outer faces; of an expansion-ring provided with springs and arranged in the bottom of the said groove, and an outer packing-ring formed of segments and wedge-shaped packing-strips inserted between the ends of the segments and bearing against the said expansion-ring, one of the said rings being provided with expansion chambers for steam at its side portions between it and the other ring, which chambers communicate with the said steam passages.

In testimony whereof I hereby affix my signature, in presence of two witnesses.

SAMUEL ROBINSON.

Witnesses:
F. A. LESTER,
J. H. NOQUS.